United States Patent
Zhu et al.

(10) Patent No.: US 10,860,219 B2
(45) Date of Patent: Dec. 8, 2020

(54) PERFORMING HYBRID WEAR LEVELING OPERATIONS BASED ON A SUB-TOTAL WRITE COUNTER

(71) Applicant: Micron Technology, Inc., Boise, ID (US)

(72) Inventors: Fangfang Zhu, San Jose, CA (US); Jiangli Zhu, San Jose, CA (US); Ning Chen, San Jose, CA (US); Ying Yu Tai, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 128 days.

(21) Appl. No.: 16/153,016

(22) Filed: Oct. 5, 2018

(65) Prior Publication Data
US 2020/0110544 A1 Apr. 9, 2020

(51) Int. Cl.
*G06F 3/06* (2006.01)
*G06F 12/10* (2016.01)

(52) U.S. Cl.
CPC ............ *G06F 3/0616* (2013.01); *G06F 3/064* (2013.01); *G06F 3/0647* (2013.01); *G06F 3/0673* (2013.01); *G06F 12/10* (2013.01); *G06F 2212/1036* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 9,811,288 B1* | 11/2017 | Chen | G06F 3/0685 |
| 2006/0161728 A1* | 7/2006 | Bennett | G11C 16/349 711/103 |
| 2010/0318719 A1* | 12/2010 | Keays | G06F 12/0246 711/103 |
| 2011/0302359 A1 | 12/2011 | Schmidberger | |
| 2012/0311228 A1 | 12/2012 | Hsu et al. | |
| 2012/0324141 A1* | 12/2012 | Seong | G06F 12/0238 711/3 |
| 2013/0282967 A1* | 10/2013 | Ramanujan | G06F 3/0689 711/103 |
| 2019/0107957 A1* | 4/2019 | Helmick | G06F 3/064 |

FOREIGN PATENT DOCUMENTS

KR 10-2011-0048494 5/2011

OTHER PUBLICATIONS

PCT International Search Report and Written Opinion for International Application No. PCTUS2019054797, dated Jan. 20, 2020, 11 pages.

* cited by examiner

*Primary Examiner* — Tracy C. Chan
(74) *Attorney, Agent, or Firm* — Lowenstein Sandler LLP (57) ABSTRACT

Data is copied, from a second group of data blocks in a second plurality of groups of data blocks that are mapped, to a first group of data blocks in a first set of groups of data blocks that are not mapped to include the first group of data blocks in the second set of groups of data blocks that are mapped. A sub-total write counter associated with the first group of data blocks is reset. A value of the sub-total write counter indicates a number of write operations performed on the first group of data blocks since the first group of data blocks has been included in the second set of groups of data blocks. A wear leveling operation is performed on the first group of data blocks based on the sub-total write counter.

16 Claims, 7 Drawing Sheets

PERFORMING HYBRID WEAR LEVELING OPERATIONS BASED ON A SUB-TOTAL WRITE COUNTER

TECHNICAL FIELD

Embodiments of the disclosure relate generally to memory sub-systems, and more specifically, relate to performing hybrid wear leveling operations based on a sub-total write counter.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to performing hybrid wear leveling operations based on a sub-total write counter. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

The memory components used by the memory sub-system can have particular properties that provide challenges in the operation of the memory sub-system. For example, some memory components, such as non-volatile memory components, have limited endurance. The individual segments, data units, or blocks of the memory components can be written, read, and/or erased only a finite number of times before physical wear causes the memory components to fail. To counteract this limited endurance of memory components, techniques have been developed to manage wear on the memory components.

One technique of managing the endurance in a conventional memory sub-system is wear leveling. A wear leveling operation can attempt to evenly distribute the read, write and erase operations, and thus the corresponding physical wear, across the memory components. One memory component can be divided into some number of individual data units, such as pages or blocks of the memory component, which each experiences physical wear. These data units can represent an individual segment of the memory component that can be written or erased in a single operation. Total write counts (e.g., the number of times a write operation that writes data to a data unit is performed on the data unit during the lifetime of the data unit), total read counts (e.g., the number of times a read operation that reads data from a data unit is performed on the data unit during the lifetime of the data unit), or total erase counts (e.g., the number of times an erase operation that erases data from a data unit is performed on the data unit during the lifetime of the data unit) can be indicators of wear on the data units of memory components. Thus, conventional wear leveling techniques often use a sorting process to find data units with high total read or total write counts and data units with low total read count or total write counts. The data from a data unit having a high total read or total write count can be swapped with the data of a data unit having a low total read or total write count in an attempt to evenly distribute the wear across the data units of the memory component.

Different types of memory components can include varying numbers of data units. For example, a cross-point array of non-volatile memory cells can have a significantly smaller data unit size than a flash-based memory component, and thus can have a significantly larger number of data units for a memory component of similar capacity. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Thus, such memory components can perform "in-place" data replacement. Since the number of data units in such a memory component is large, a significant amount of computing resources (e.g., processing and memory resources) are used to retrieve, store, and sort various data units associated with the memory component. Additionally, retrieving, storing, and sorting the large number of data units takes a proportionately large amount of time, which contributes significantly to latency of the memory sub-system.

Due to the large number of data units for certain types of memory, data units can be grouped into groups of data units. One purpose of grouping data units together can be to save metadata space and reduce system overhead of maintaining and managing the large number of data units. A group of data units can be referred to as a super management unit (SMU), a group of data management units, a superblock, or a group of data blocks herein. A data unit can be referred to as a data management unit or a data block herein. In certain types of memory, over-provisioning provides more physical blocks than the logical capacity. Thus, there can be some groups of data blocks that are mapped to data and some groups of data blocks that are unmapped to data. A mapped group of data blocks can include data blocks that are currently mapped to data (e.g., storing data) and an unmapped group of data blocks can include data blocks that are not currently mapped to data (e.g., not storing data). The mapped groups of data blocks can be organized into a set or pool of mapped groups of data blocks and the unmapped groups of data blocks can be organized into a set or pool of unmapped groups of data blocks.

Various conditions can be used to determine when to swap a group of data blocks in the mapped group of data blocks with a group of data blocks in the unmapped group of data blocks by copying data from the group of data blocks in the mapped group of data blocks to the group of data blocks in the unmapped group of data blocks. In conventional memory sub-systems, the conditions rely on a total write counter for the groups of data blocks (e.g., a historical write count for the group of data blocks over a lifetime of the group of data blocks). Using the total write counters for the groups of data blocks to move groups of data blocks between the set of mapped groups of data blocks and the set of unmapped groups of data blocks can lead to write amplification. Write amplification can refer to increasing the frequency of performing write operations. For example, a first condition (e.g., a lowest write count condition or "cold" swap condition) can specify swapping a first group of data blocks in the set of mapped groups of data blocks with a second group of data blocks in the set of unmapped group of data blocks when the first group of data blocks becomes "cold". Becoming "cold" can refer to the first group of data blocks having a minimum total write counter relative to other groups of data blocks in the set of mapped group of data blocks and its minimum total write counter being lower than a total write counter of the second group of data blocks, which is a minimum relative to the other groups of data blocks in the set of unmapped group of data blocks.

However, copying data to a large number of data blocks included in the second group of data blocks to include the second group of data blocks in the set of mapped groups of data blocks can cause a number of writes commensurate to the large number of data blocks. Accordingly, a write count of the group of data blocks being added to the set of mapped groups of data blocks can increase to a value where a second condition (e.g., a highest write count condition or "hot" swap condition) is satisfied. Without a mechanism to detect whether the second group of data blocks was recently written to (e.g., is "hot"), the second group of data blocks can be selected to copy its data to another group of data in the set of unmapped groups of data blocks and wear leveling is not achieved. Additionally, write amplification can become unbounded.

Further, another goal of wear leveling can be to attempt to converge the difference between the total write counters of the groups of data blocks, where each total write counter of a group of data blocks is a sum of the total write counters of the respective data blocks included in that group of data blocks, and/or to converge the difference between the total write counters of the individual data blocks within each of the groups of data blocks. In conventional memory sub-systems that rely on just the total write counter for conditions, as described above, the write amplification can cause certain total write counters of groups of data blocks to diverge from the rest of the total write counters of the other groups of data blocks. Thus, some groups of data blocks with higher total write counters can degrade faster than others. Also, unbounded write amplification can result in degradation of the performance of the memory sub-system as more writes are being performed and latency is experienced by a host system connected to the memory sub-system as the bandwidth drops while the writes are being performed. Since wear leveling is not achieved, the life of the memory components as a whole can be reduced.

Aspects of the disclosure address the above and other deficiencies by implementing performing hybrid wear leveling operations based on the sub-total write counter. In one implementation, hybrid wear leveling utilizes a hierarchy of levels of data units having different sizes. For example, a first level can represent individual data units, such as a data block or page of a memory component, while a second level can represent a group of multiple data units or data blocks.

Wear leveling can be performed at each level of the hierarchy using different wear leveling techniques. For example, hybrid wear leveling can include wear leveling at the first level (intra-SMU wear leveling) by moving a base pointer between data blocks within a group of data blocks based on a condition (e.g., when wear leveling at the second level occurs), or other frequency, and wear leveling at the second level (inter-SMU wear leveling) using indirect fully associative mapping implemented by a mapping data structure (e.g., a look-up table) after at least a sub-total write counter or fresh write counter associated with a mapped group of data blocks exceeds a threshold value. The sub-total write counter includes a value that indicates a number of write operations performed on the mapped grouped of data blocks since the group of data blocks became mapped to data (e.g., data was copied from another group of data blocks to the mapped grouped of data blocks) and swapped to the set of mapped group of data blocks from the set of unmapped group of data blocks.

Intra-SMU wear leveling can include changing an association of the base pointer from one data block in a group of data blocks to another data block in the group of data blocks to ensure that the difference between total write counters of the data blocks in the group converge to a value or range. The base pointer can represent a first index of a set of indices associated with the group of data blocks. Thus, the metadata for each SMU can include at least the base pointer for that SMU. A new address for the base pointer can be determined within the SMU using at least one of a set of address determining techniques including a deterministic function, a mapping function, a randomization function, a look-up table, or a bit map. The new address of the base pointer and an index of the address determining technique in the set of address determining techniques can be stored for the group of data blocks. Any access attempts to a logical address of a data block in the group of data blocks can use at least the new address of the base pointer and/or the index of the address determining technique to determine a physical address of the requested data block. In some embodiments, the intra-SMU wear leveling operation can be triggered when the inter-SMU wear leveling operation is performed.

Inter-SMU wear leveling can include swapping all of the data blocks of an SMU that is mapped (e.g., storing data) to the data blocks of an SMU that is free (e.g., not mapped and not storing data). The former SMU becomes a free SMU and the latter SMU becomes a mapped SMU. In this way, the SMU in the set of mapped SMUs is included in the set of unmapped SMUs, and the SMU in the set of unmapped SMUs is included in the set of mapped SMUs. In some embodiments, one data block of an SMU can be swapped with another data block in another SMU at a time, while in other embodiments, multiple data blocks of an SMU can be concurrently swapped with multiple data blocks in another SMU.

In some embodiments, in addition to a base pointer, other metadata can be associated with each of the SMUs to enable a difference between total write counters to converge and to bound write amplification. For example, a sub-total write counter or fresh write counter and a total write counter can be associated with each SMU. The sub-total write counter can include a value that indicates a number of write operations performed on the respective SMU since data from another SMU is copied to the respective SMU and the respective SMU is included in the set of mapped SMUs. That is, the sub-total write counter can include a value indicating a number of write operations performed on the respective SMU since the respective SMU was swapped from the set of unmapped SMUs to the set of mapped SMUs. The total write counter can include a value indicating a total historical write count for the SMU over the lifetime of the SMU (e.g., before the SMU is moved to the set of mapped SMUs and since the SMU is moved to the set of mapped SMUs). Any time data is copied from a mapped SMU to an unmapped SMU, the unmapped SMU becomes a mapped SMU and the sub-total write counter for the new mapped SMU is reset. Also, the total write counter for the new mapped SMU is not reset. Further writes to the new mapped SMU in the set of mapped SMUs can cause the sub-total write counter to increment and the total write counter to increment. To ensure that data of the new mapped SMU is not copied to another SMU in the set of unmapped SMUs too quickly after becoming a mapped SMU, the inter-SMU wear leveling operation can be performed on the new mapped SMU when the sub-total write counter exceeds a threshold value as a first threshold wear condition. In this way, the "hotness" of the SMU can be detected and write amplification can be bounded by preventing SMUs that were recently mapped to data from being unmapped to data before desired. The threshold value can be any suitable number and can be tunable.

In some embodiments, the wear leveling operation can be performed based on the sub-total write counter and the total write counter. For example, in addition to satisfying the first threshold wear condition, an additional wear level condition can include comparing the total write counter of the SMU to another SMU having a minimum total write counter relative to the other SMUs in the set of mapped SMUs and the set of unmapped SMUs. A determination can be made as to whether the difference between the values of the total write counters exceeds a threshold value. If the sub-total write counter exceeds a threshold value and the total write counter is larger than a minimum total write counter of another SMU by a threshold value, then the inter-SMU wear leveling operation can be performed to copy data from the SMU in the set of mapped SMUs to another SMU in the set of unmapped SMUs.

Advantages of the present disclosure include, but are not limited to, increasing performance of the memory sub-system by using the sub-total write counter to bound write amplification and reduce latency for performing the write operations. The bandwidth between a host system and the memory sub-system can also be improved by bounding the amount of write operations being performed by the hybrid wear leveling operations. The cost of performing the wear leveling can be reduced as fewer write operations are being performed. Also, the difference between the total write counters of the groups of data blocks and/or the difference between individual data blocks can converge to a desired value or range, thereby achieving wear leveling. Achieving wear leveling can result in extending the useful operation of the memory components.

Figure 1:
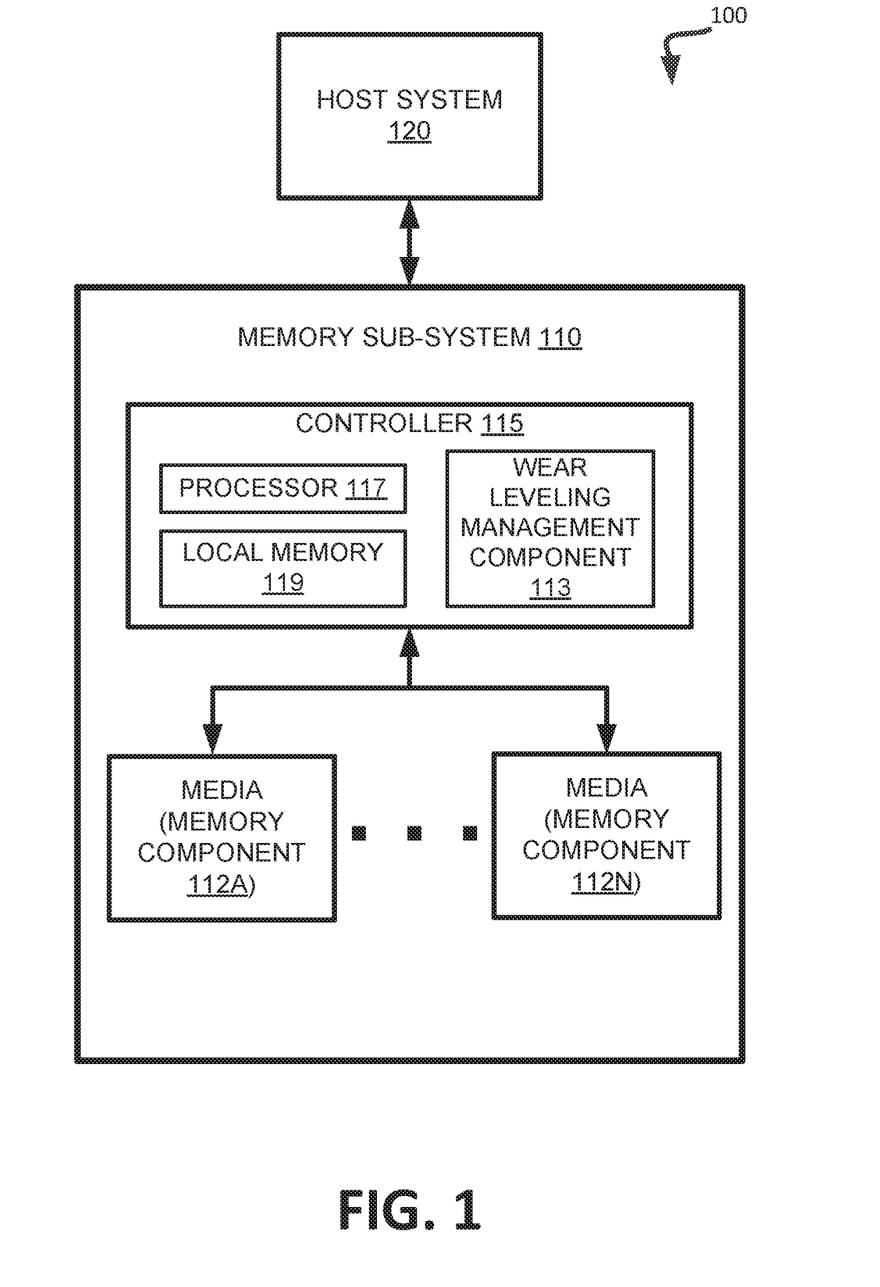
FIG. 1 illustrates an example computing environment that includes a memory sub-system, in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a wear leveling management component 113 that can be used to perform hybrid wear leveling operations based on the sub-total write counter that enable total write counter difference convergence and bounded write amplification. In some embodiments, the controller 115 includes at least a portion of the wear leveling management component 113. For example, the controller 115 can include a processor 117 (processing device) configured to execute instructions stored in local memory 119 for performing the operations described herein. In some embodiments, the wear leveling management component 113 is part of the host system 120, an application, or an operating system.

The wear leveling management component 113 can enable total write counter difference convergence and bounded write amplification when performing the hybrid wear leveling operations across the memory components 112A to 112N. The wear leveling operations performed can include intra-SMU wear leveling and inter-SMU wear leveling. The intra-SMU wear leveling operation can include determining a new address for a base pointer associated with an SMU at a certain frequency. In some embodiments, the intra-SMU wear leveling operation can be performed when the inter-SMU wear leveling operation is performed. The inter-SMU wear leveling operation can include determining at least when a sub-total write counter, which includes a value indicating a number of write operations performed on an associated SMU since the associated SMU was included in a set of mapped SMUs, exceeds a threshold value. Further details with regards to the operations of the wear leveling management component 113 are described below.

Figure 2:
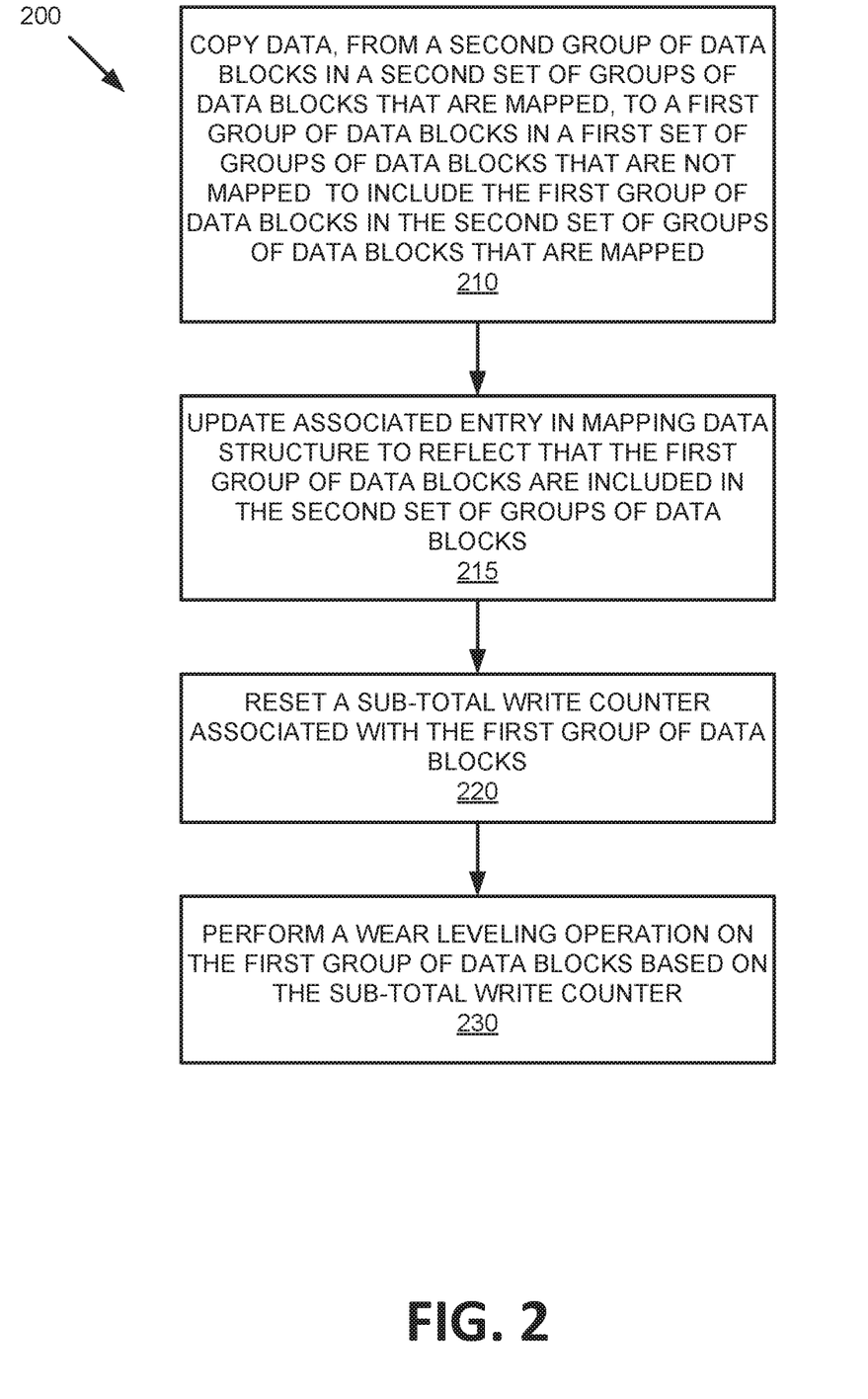
FIG. 2 is a flow diagram of an example method for performing an inter-SMU wear leveling operation based on a sub-total write counter, in accordance with some embodiments of the present disclosure.

FIG. 2 is a flow diagram of an example method 200 for performing an inter-SMU wear leveling operation based on a sub-total write counter, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the wear leveling management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device copies data, from a second group of data blocks in a second set of groups of data blocks that are mapped (e.g., set of mapped SMUs), to a first group of data blocks in a first set of groups of data blocks that are not mapped (e.g., set of unmapped SMUs) to include the first group of data blocks in the second set of groups of data blocks that are mapped. To include the first group of data blocks in the second set of groups of data blocks, the processing device can copy data from the second group of data blocks in the second set of groups of data blocks that are mapped to the first group of data blocks, thereby mapping the first group of data blocks to the data. Further, as an optional operation, the processing device can erase the data from the second group of data blocks.

At operation 215, the processing device updates an associated entry in a mapping data structure (depicted in FIG. 4B) to reflect that the first group of data blocks are included in the second set of groups of data blocks. Prior to copying data to the first group of data blocks, logical indices of the second set of groups of data blocks were mapped to the second group of data blocks that was storing the data. Upon copying the data to the first group of data blocks to include the group of data blocks in the second set of groups of data blocks, wear leveling management component 113 updates the mapping of the logical indices and logical block addresses from the physical addresses of the second group of data blocks to the physical addresses of the first group of data blocks in one or more entries in the mapping data structure. In some embodiments, the mapping data structure can be updated for the inverse mapping from physical addresses to logical addresses.

At operation 220, the processing device resets a sub-total write counter associated with the first group of data blocks when the data is copied to the first group of data blocks and the first group of data blocks is included in the second set of groups of data blocks. Each group of data blocks from the first and second sets can be associated with a respective sub-total write counter. The sub-total write counter can be included in respective metadata for the groups of data blocks. The sub-total write counter includes a value that indicates a number of writes to the group of data blocks since the group of data blocks has been included in the second set of groups of data blocks. The sub-total write counter can be used to ensure that the data in a group of data blocks is not copied to another group of data blocks too soon after being included in the second set of groups of data blocks. That is, the sub-total write counter can be used to detect whether the group of data blocks is "hot" and can bound write amplification by preventing moving data stored at the group of data blocks until a threshold condition is satisfied. Further, the sub-total write counter can enable the difference between total write counters of the groups of data blocks to converge to a desired value or range by controlling how often the groups of data blocks are swapped in the inter-SMU wear leveling operation.

The host system 120 can request one or more writes to the first group of data blocks. The processing device can perform one or more writes to write data to the first group of data blocks. The processing device can increment the value of the sub-total write counter one or more times based on the one or more writes. The writes can also cause a value of a total write counter associated with the first group of data blocks to be incremented. The total write counter can be included in metadata for the group of data blocks. The total write counter can be distinguished from the sub-total write counter for the first group of data blocks in that the total write counter can include a value indicating a historical total number of writes to the first group of data blocks over a lifetime of the first group of data blocks. For example, the total write counter indicates the number of writes before the first group of data blocks was most recently included in the second set of groups of data blocks and after the first group of data blocks was most recently included in the second set of groups of data blocks. Thus, the total write counter is not reset when data is copied from the second group of data blocks to the first group of data blocks, and the first group of data blocks is swapped from being included in the first set of groups of data blocks (e.g., set of unmapped groups of data blocks) to being included in the second set of groups of data blocks (e.g., set of mapped groups of data blocks). Additionally, the total write counter is incremented by the size of the first group of data blocks when it is moved to the second set of groups of data blocks, as every data block in the first group of data blocks is written once during the move. Each group of data blocks in the first set of groups of data blocks and the second set of groups of data blocks can be associated with a respective total write counter.

At operation 230, the processing device performs a wear leveling operation (e.g., inter-SMU wear leveling operation) on the first group of data blocks based on the sub-total write counter. Performing the wear leveling operation on the first group of data blocks based on the sub-total write counter can include determining that the first group of data blocks satisfies a threshold wear condition. The threshold wear condition can include the value of the sub-total write counter exceeding a threshold value. The threshold value can be any suitable amount and can be tunable. For example, the threshold value can be initially set to a small value and can increase over time to evenly distribute writes to the first groups of data blocks. Gradually increasing the threshold value can be performed because the memory component can tolerate more difference between total write counters as the cells of the memory components experience increased wear. In one example, the threshold value can be set to or based on the size of the group of data blocks.

In some embodiments, the processing device can perform the inter-SMU wear leveling operation on the first group of data blocks based on the sub-total write counter and the total write counter associated with the first group of data blocks. The processing device can determine whether a threshold condition is satisfied when the value of the total write counter exceeds a value of another total write counter of another group of data blocks by more than a first threshold value, and the value of the sub-total write counter exceeds a second threshold value. The value of the total write counter is a maximum value relative to values of total write counters associated with other groups of data blocks in the first set and second set of groups of data blocks, and the value of the another total write counter is a minimum value relative to the values of the total write counters associated with the other groups of data blocks in the first set and second set of groups of data blocks (represented as Total Write Count$_{max}$−Total Write Count$_{min}$>Threshold$_{SMU}$).

It should be understood that using just the sub-total write counter to determine whether a threshold condition is satisfied can cause the inter-SMU wear leveling operation to be performed more frequently than using both the sub-total write counter and the total write counter to determine whether the threshold condition is satisfied. As described further below, the intra-SMU wear leveling operation can be triggered when the inter-SMU wear leveling is triggered. Causing the intra-SMU wear leveling operation to be performed more frequently can result in more evenly distributed writes amongst the data blocks within an SMU, and thus, the sub-total write counter can be used as the criteria for determining the threshold condition when the frequency of performing the intra-SMU wear leveling operation is tied to performing the inter-SMU wear leveling operation.

In some embodiments, in addition to swapping SMUs between the set of mapped SMUs and the set of unmapped SMUS based at least on the sub-total write counter of SMUs (e.g., a "hot swap" condition), the processing device can swap SMUs that become "cold" (e.g., a "cold swap" condition). An SMU can be cold when the SMU is associated with a minimum total write counter relative to the other SMUs in the set of mapped SMUs and a value of the minimum total write counter of that SMU is less than a minimum total write counter associated with another SMU in the set of unmapped SMUs. Regardless of which strategy is used for swapping SMUs under "hot swap" conditions, the swapping under the "cold swap" condition described above is executed to enable converging the difference between the total write counters to a range or value.

Figure 3:
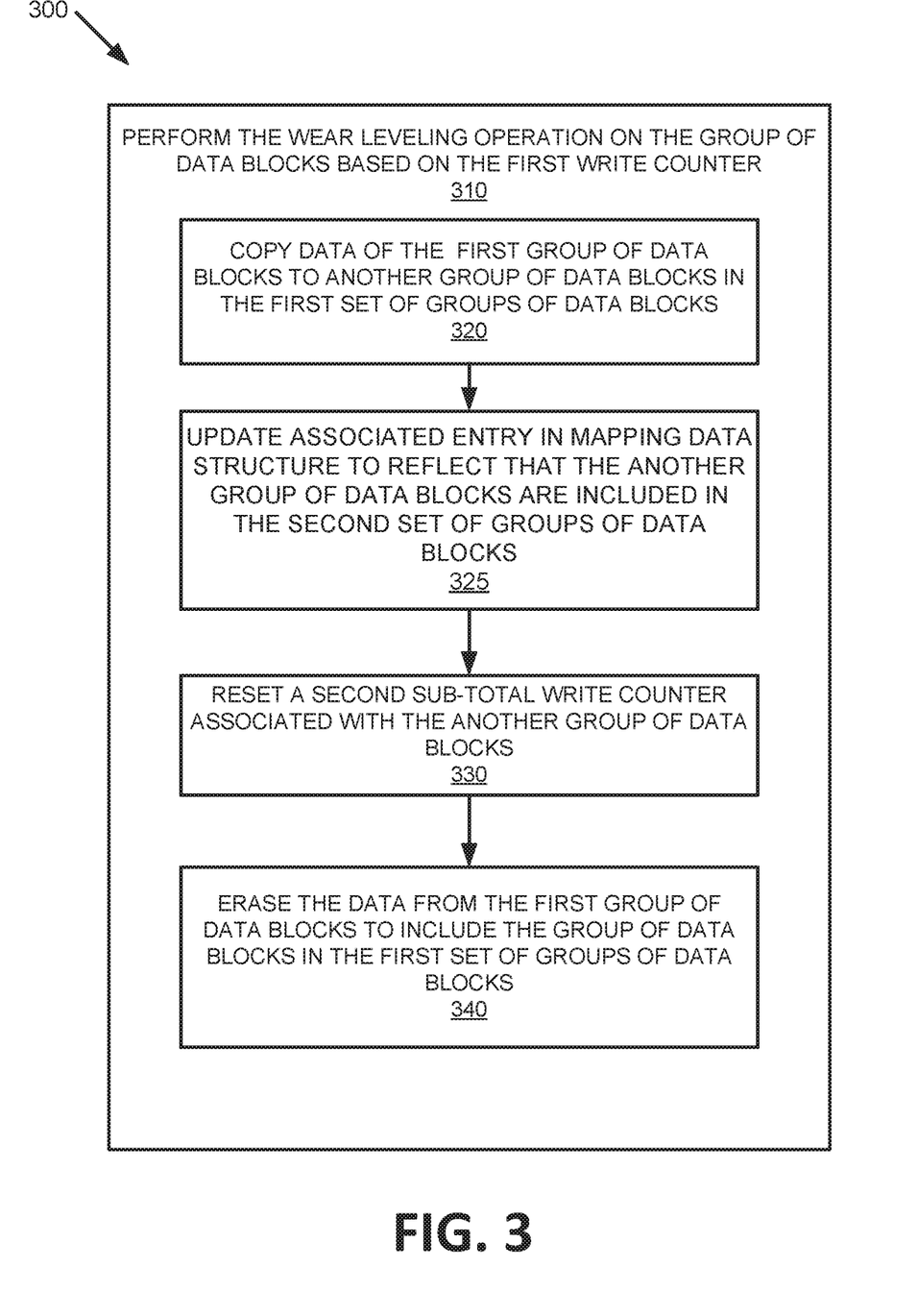
FIG. 3 is a flow diagram of an example method for performing the inter-SMU wear leveling operation by copying data from a group of data blocks to another group of data blocks and resetting a sub-total write counter associated with the another group of data blocks, in accordance with some embodiments of the present disclosure.

FIG. 3 is a flow diagram of an example method 300 for performing the inter-SMU wear leveling operation by copying data from a group of data blocks to another group of data blocks and resetting a second sub-total write counter associated with the another group of data blocks, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the wear leveling management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device performs the wear leveling operation on the group of data blocks based on the first write counter. Operation 310 can be performed as operation 230 of method 200 in FIG. 2. Operation 310 can include performing additional operations 320, 330, and 340.

At operation 320, the processing device copies data of the first group of data blocks to another group of data blocks in the first set of groups of data blocks (e.g., set of unmapped SMUs). As a result, the another group of data blocks is mapped with data and is included in the second set of groups of data blocks (e.g., set of mapped SMUs).

At operation 325, the processing logic updates an associated entry in a mapping data structure (depicted in FIG. 4B) to reflect that the another group of data blocks are included in the second set of groups of data blocks. For example, upon copying the data to the another group of data blocks, wear leveling management component 113 updates the mapping of the logical indices and logical block addresses from the physical addresses of the first group of data blocks to the physical addresses of the another group of data blocks in an entry in the mapping data structure. In some embodiments, the mapping data structure can be updated for the inverse mapping from physical addresses to logical addresses.

At operation 330, the processing device resets a second sub-total write counter associated with the another group of data blocks. The second sub-total write counter can be used to ensure that the data stored at the another group of data blocks is not copied to yet another group of data blocks too soon after being copied to the another group of data blocks. Accordingly, write amplification can be bounded for the another group of data blocks, which can increase bandwidth and reduce latency for the memory sub-system 110 communicating with the host system 120. Further, the use of the second sub-total write counter, in conjunction with the sub-total write counters associated with the other groups of data groups, can enable the difference between the total write counters associated with the groups of data groups to converge and thereby extend the life of the memory components 112A to 122N.

At operation 340, the processing device erases the data from the first group of data blocks to cause the group of data blocks to be included in the first set of groups of data blocks (e.g., set of unmapped SMUs). Operation 340 is optional as erasing the data is not required for in-place memory components, such as cross-point arrays. In other words, after the data is copied from the first group of data blocks to the another group of data blocks, the first group of data blocks is no longer mapped to data. The sub-total write counter for the first group of data blocks and the total write counter for the first group of data blocks can be maintained at the same values. When different data is subsequently copied to the first group of data blocks and the first group of data blocks is included in the second set of data blocks (e.g., set of mapped SMUs) again, the sub-total write counter can be reset, while the total write counter is not reset.

Figure 4A:
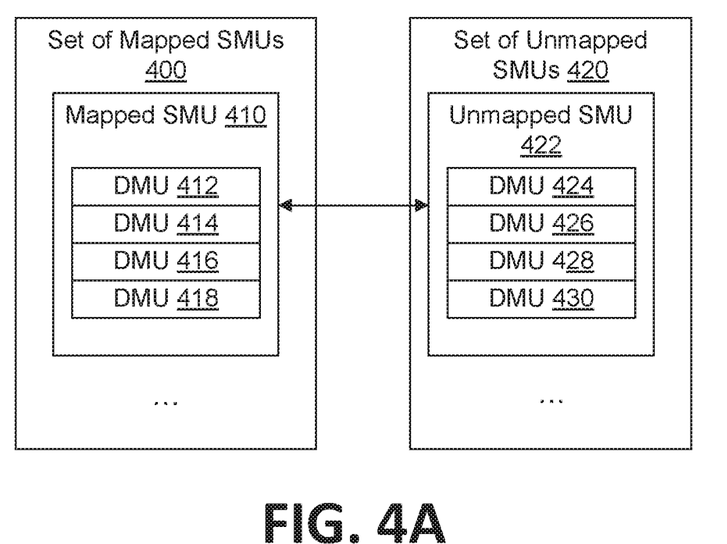
FIG. 4A illustrates inter-SMU wear leveling using a set of mapped groups of data blocks and a set of unmapped groups of data blocks, in accordance with some embodiments of the present disclosure.

FIG. 4A illustrates inter-SMU wear leveling using a set of mapped data blocks 400 and a set of unmapped data blocks 420, in accordance with some embodiments of the present disclosure. Data management units (DMUs) are one example of a data unit. For example, a data management unit can be a page (e.g., smallest unit of data that can be written to or read) of a cross-point array of non-volatile memory or a data block (e.g., smallest unit of data that can be erased) of flash-based memory. Super management units (SMUs) can include a group of data management units (e.g., 1000 DMUs). The group of data management units of memory components 112 can be all or a majority of the pages or data blocks of memory components 112. When an SMU includes DMUs that are mapped to data (programmed with data or available to be programmed with data), the SMU can be referred to as a mapped SMU. When an SMU includes DMUs that are not mapped to data (not programmed with data or not accessible by the host system) or are empty, the SMU can be referred to as an unmapped SMU.

FIG. 4A illustrates an example of a mapped SMU 410 and an unmapped SMU 422. Mapped SMU 410 includes a number of mapped DMUs 412, 414, 416, and 418. Unmapped SMU 422 also includes a number of unmapped DMUs 424, 426, 428, and 430. The mapped SMU 410 can be included in the set of mapped SMUs 400 and the unmapped SMU 422 can be included in the set of unmapped SMUs 420. Only a limited number of mapped SMUs and unmapped SMUs are depicted in the set of mapped SMUs and the set of unmapped SMUs, respectively, but in practice any number of mapped SMUs and unmapped SMUs can be included in the set of mapped SMUs and the set of unmapped SMUs. Further, each of the mapped SMUs and the unmapped SMUs can include any number of data management units.

In one embodiment, hybrid wear leveling management component 113 can perform inter-SMU wear leveling by swapping the mapped SMU 410 with the unmapped SMU 422. For example, when a threshold condition is satisfied, such as the sub-total write counter associated with the mapped SMU 410 exceeding a threshold value, the data of the mapped SMU 410 can be copied to the set of unmapped SMUs 420 and the unmapped SMU 422 can be included in the set of mapped SMUs 400. The inter-SMU wear leveling operation can use indirect fully associative mapping implemented by a mapping data structure to store the mappings of logical addresses to the physical addresses of the SMUs as the SMUS are swapped between the set of mapped SMUs 400 and the set of unmapped SMUs 420.

In some implementations, a wear leveling operation can rewrite data of a data unit having a high wear metric to another data unit having a lower wear metric, or vice versa (e.g., rewrite data of a data unit having a low wear metric to another data unit having a higher wear metric). In implementations, a wear metric can be indicative of a level of physical wear on a data unit. Some examples of wear metrics can include write count, read count, or a combination of write count and read count. Although the discussion herein focuses mainly on write counts, it should be noted that additional types of counts can be implemented using similar techniques.

In some implementations, a wear metric can include a combination of a write count and a read count. For example, the wear metric can include both the write count and the read count for a particular data unit where the write count and read count are combined using one or more equations. The physical wear on a data unit caused by a read operation can be less than the physical wear caused by a write operation. To combine the read count and write count for a data unit, the read count or write count for a data unit can be normalized (e.g., adjusting counts measured by different scales to a common scale) by weighting the write count or the read count. For instance, a read count for a data unit can be multiplied by a fraction (e.g., 0.8) to determine the equivalent number of write counts that the read counts represents in terms of wear. The weighted read count and the write count for the data unit can be combined (e.g., added) and be used as a wear metric indicative of the physical wear on the particular data unit.

In some implementations, memory components 112 can include non-volatile memory devices, such a non-volatile memory devices that include a cross-point array of non-volatile memory cells. As noted above, a cross-point array of non-volatile memory can perform bit storage based on a change of bulk resistance, in conjunction with a stackable cross-gridded data access array. Additionally, in contrast to many flash-based memories that perform write out-of-place operations (e.g., data at location that is to be written is erased before other data can be programmed to the location), cross-point non-volatile memory can perform a write in-place operation, where a non-volatile memory cell can be programmed without the non-volatile memory cell being previously erased. It can be noted that the wear metrics for cross-point non-volatile memory cannot include an erase count due to the ability of the cross-point non-volatile memory to perform write in-place operations. An erase count can be used to determine wear metrics for other types of memory components. The erase count can be a value indicating the number of times a memory operation, such as an erase operation that erases data of a data unit, is performed on the data unit during the lifetime of the data unit. Aspects of the disclosure can be applied to other types of non-volatile memory components or other types of memory components.

Figure 4B:
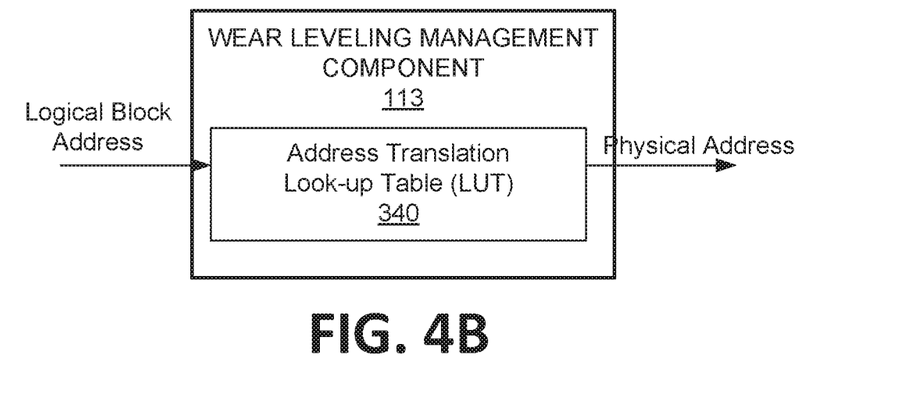
FIG. 4B illustrates inter-SMU wear leveling to be performed using indirect mapping, in accordance with some embodiments of the present disclosure.

FIG. 4B illustrates inter-SMU wear leveling to be performed using indirect mapping, in accordance with some embodiments of the present disclosure. With indirect mapping, additional information is used to determine the target physical location on the memory component 112. In one embodiment, wear leveling management component 113 copies data from the super management unit to an available physical location on the memory component 112. The available physical location can be determined in any number of ways, such as a location having a lowest write count, a location having been least recently accessed, etc. A list of available locations can be maintained in a free pool (e.g., set of unmapped SMUs 422) stored in local memory 119. Upon copying the data, wear leveling management component 113 records a mapping of a logical index and a logical block address associated with the data from the super management unit to the available physical index in an entry in a mapping data structure (e.g., look-up table 340). In one embodiment, the look-up table 340 is included in the wear leveling management component 113 and/or is maintained in local memory 119 of controller 115. Thus, when the logical block address and/or the logical index is applied to look-up table 340, the corresponding physical address is output. In some embodiments, the look-up table 340 can be updated for the inverse mapping from physical address to logical address. This inverse mapping can be included in metadata. In other embodiments, the mapping can be maintained in some other type of data structure, such as an array, linked list, etc.

Figure 5:
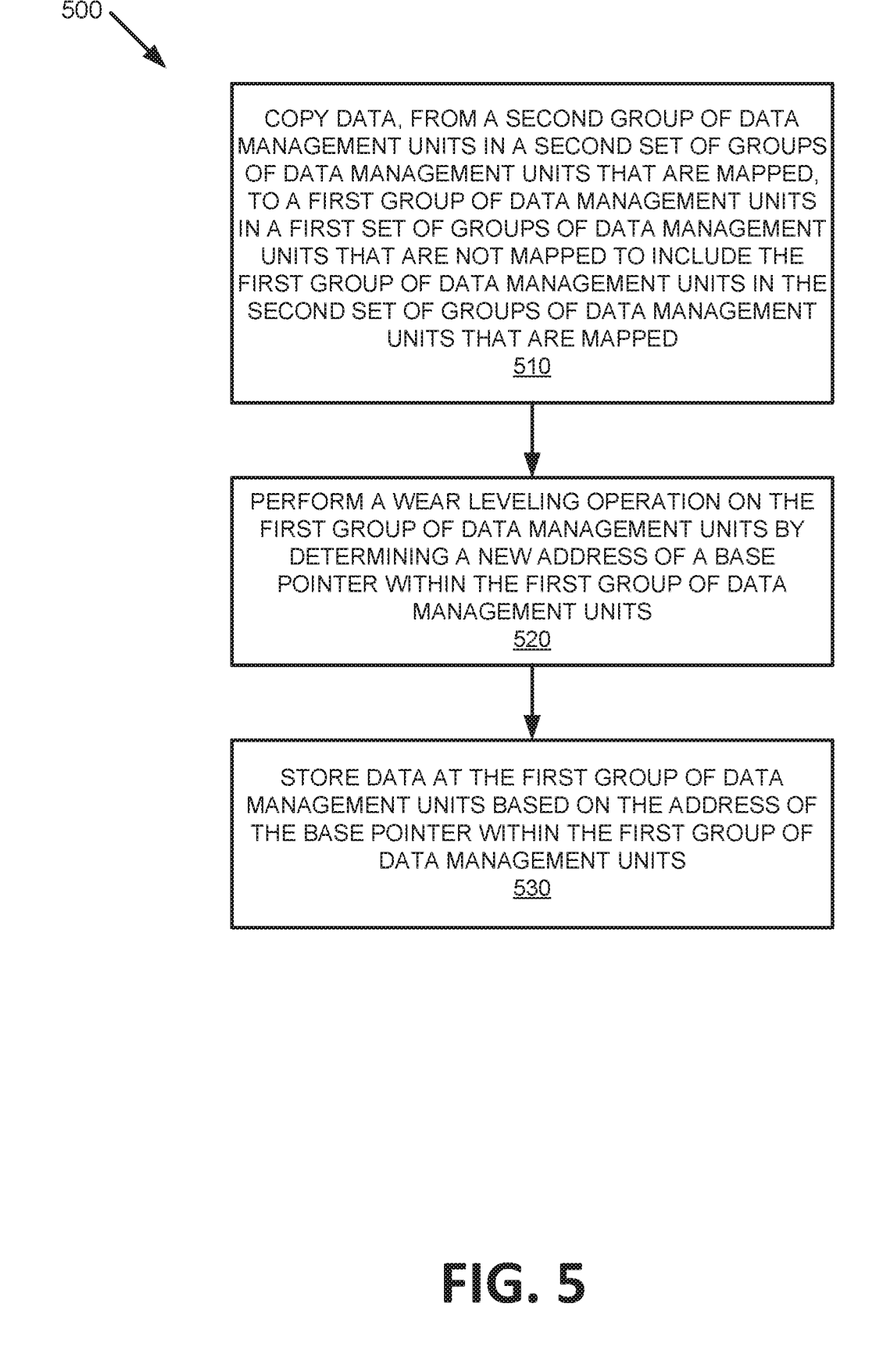
FIG. 5 is a flow diagram of an example method for performing an intra-SMU wear leveling operation by determining a new address for a base pointer associated with a group of data blocks, in accordance with some embodiments of the present disclosure.

FIG. 5 is a flow diagram of an example method 500 for performing an intra-SMU wear leveling operation by determining a new address for a base pointer associated with a group of data blocks, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the wear leveling management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing device copies data, from a second group of data management units in a second set of groups of data management units that are mapped (e.g., set of mapped SMUs), to a first group of data management units in a first set of groups of data management units that are not mapped (e.g., set of unmapped SMUs) to include the first group of data management units in the second set of groups of data management units that are mapped. The processing device can copy data to the first group of data management units in response to determining that the second group of data management units in the second set of groups of data management units satisfies a threshold condition based on a sub-total write counter associated with the second group of data management units. For example, the sub-total write counter associated with the second group of data management units can be determined to exceed a threshold value. The value of the sub-total write counter indicates a number of writes to the second group of data management units since the second group of data management units was included in the second set of groups of data management units. Upon being included in the second set of groups of data management units, a sub-total write counter associated with the first group of data management units can be reset (e.g., set to a value of '0').

At operation 520, the processing device performs a wear leveling operation (e.g., intra-SMU wear leveling operation) on the first group of data management units by determining a new address of a base pointer within the first group of data management units. The base pointer indicates the location of the beginning of the first group of data management units (i.e., the location of the first data management unit). Thus, the base pointer represents a first index of a set of indices each associated with a respective data management unit of the first group of data management units. The base pointer can be included in metadata for the first group of data management units, in addition to the sub-total write counter and the total write counter. The new address of the base pointer can be determined using at least one of a set of address determining techniques including a deterministic function, a mapping function, a randomization function, a look-up table, or a bit map. Each of the address determining techniques can result in a value that is mapped to a requested address. The new address of the base pointer and an index of the address determining technique in the set of address determining techniques can be stored for the group of data blocks. Any access attempts to a logical address of a data block in the first group of data blocks can use at least the new address of the base pointer and/or the index of the address determining technique to determine a physical address of the data block requested.

One example address determining technique can include a function for determining a new address for a pointer and can be represented as follows:

physical address=(logical address+base address)% SMU size

Where the physical address is the physical address of the data management unit in the memory component, the logical address is the address at which the data management unit appears to reside to the user and can be different than the physical address, the base address is the address of the data management unit at which the base pointer resides, and SMU size is the number of data management units included in the SMU. This function can be associated with an index in the set of address determining techniques and can be used to determine the physical address of a data management unit after the base pointer is associated with the new address. Another example address determining technique can include another function that can be represented as follows:

physical address=(α*base address+β)% SMU size

Where α, base address, and β are random values, and can be generated during the runtime of the memory component. The α, base address, and β can be stored and synced in a metadata table, such that when translation is requested, the α, base address, and β can be retrieved and used. SMU size is the number of data management units in the SMU. This function can be associated with an index in the set of address determining techniques and can be used to determine the physical address of a data management unit after the base pointer is associated with the new address. Another address determining technique can include a randomization function that randomizes the base address and can be represented as follows physical address=ƒ(base address)

ƒ is a function and can be a general representation of the functions physical address=(logical address+base address)% SMU size or physical address=(α*base address+β)% SMU size described above. ƒ can also be represented as a bit mapping. This function can be associated with an index in the set of address determining techniques and can be used to determine the physical address of a data management unit after the base pointer is associated with the new address. Another address determining technique can include a randomized or non-randomized look-up table that can be used to determine a new base address and can be referenced when requests are received that include logical addresses for data management units to determine the physical addresses for the logical addresses. In another example, the address determining technique can include a bit map that can be used to determine a new base address and can be referenced when requests are received that include logical addresses for data management units.

At operation 530, the processing device stores data at the first group of data management units based on the address of the base pointer within the first group of data management units. The processing device can identify the address determining technique that was used to determine the new address of the base pointer based on an index of the address determining technique in a set of address determining techniques. The processing device can use the address determining technique with the new address of the base pointer to determine the physical address of the data management unit at which the data is stored in the first group of data management units.

For example, the processing device can receive a request to access a logical address associated with a data management unit included in the first group of data management units. The processing device can identify a process determining technique that adds the logical address to the new address of the base pointer to obtain a result address. The processing device can determine a remainder after dividing the result address by a size of the first group of data management units, and return the remainder as the physical address of the data management unit. The physical address can be used to store data at the data management unit.

It should be understood that the intra-SMU wear leveling can be performed when the inter-SMU wear leveling operation is performed, in one embodiment, and thus, there is one atomic operation (SMU move) that uses less overhead processing resources than two separate operations. The intra-SMU wear leveling operation can cause the difference between the total write counts for the data management units within a group of data management units to converge to a desired value or range.

Figure 6:
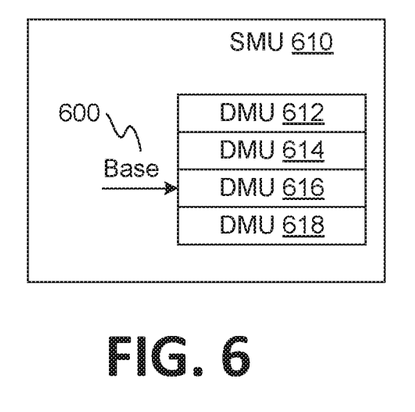
FIG. 6 illustrates intra-SMU wear leveling using a base pointer associated with a group of data blocks, in accordance with some embodiments of the present disclosure.

FIG. 6 illustrates intra-SMU wear leveling using a base pointer 600 associated with a group of data blocks (SMU 610), in accordance with some embodiments of the present disclosure. In one embodiment, an address determining technique can be used to determine the new address for the base point 600. For example, the address determining technique can include a function that can be used to determine the new address of the base pointer and to determine an appropriate physical location to which data can be moved in the wear leveling operation based on the base pointer (e.g., actual address=(logical address+base address)% SMU size).

Depending on the embodiment, the address determining technique can include at least one of a deterministic function, a randomization function, a mapping function, a linear function, a look-up table, a bit map or some other appropriate function. The function can result in a direct mapping of a logical index to a new physical location in the super management unit 610. In one embodiment, wear leveling management component 113 maintains a base pointer 600 address for super management unit 610 including data management units 612, 614, 616, and 618. The base pointer 600 address indicates the location of the beginning of the super management unit 610 (i.e., the location of the first data management unit 616). Moving the base pointer to different data management units at a certain frequency (e.g., when the inter-SMU wear leveling operation is performed based on the sub-total write counter exceeding a threshold value) can enable wear leveling of the data management units by converging the total write counters of the data management units.

Figure 7:
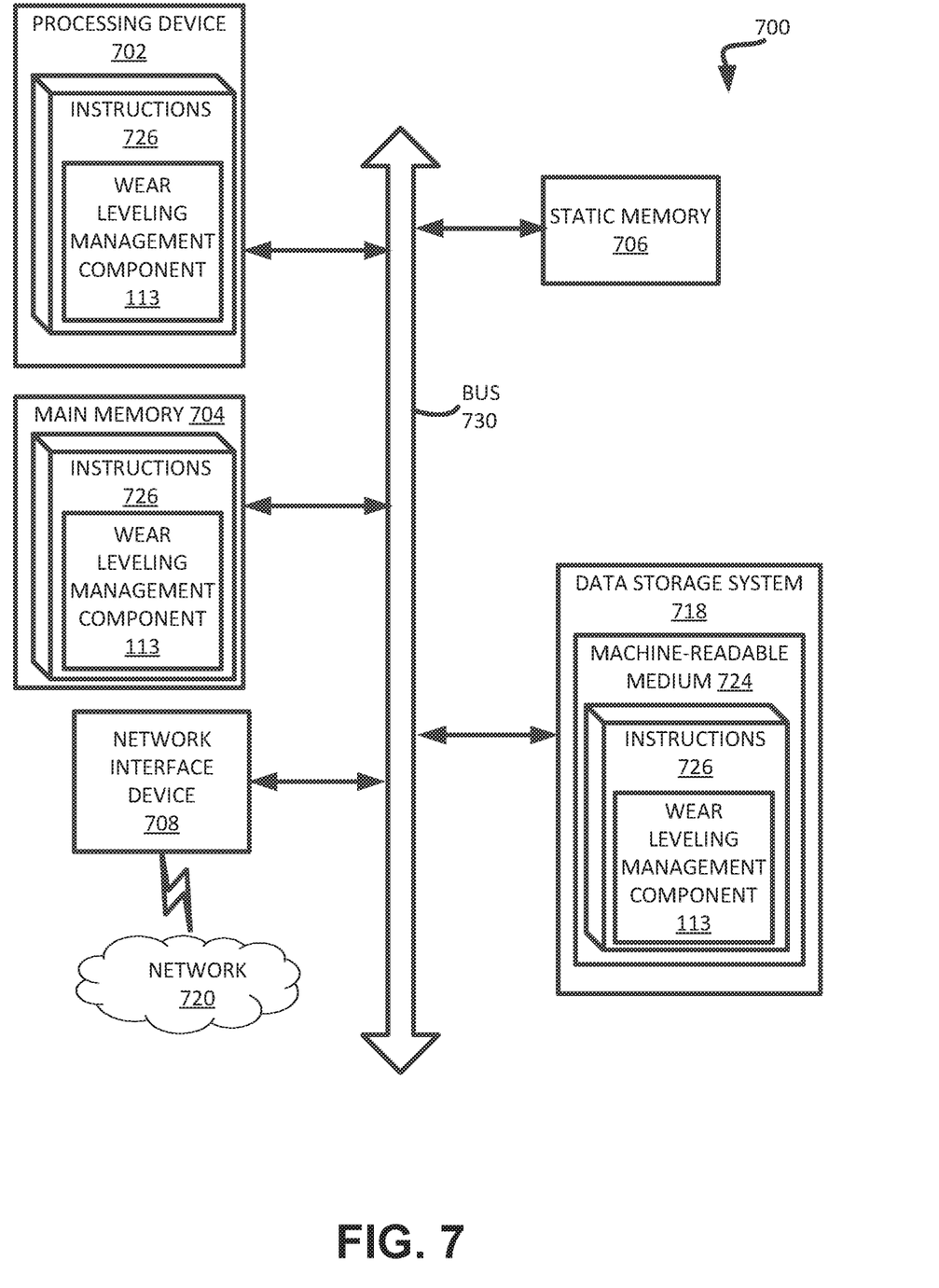
FIG. 7 is a block diagram of an example computer system, in accordance with some embodiments of the present disclosure.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the wear leveling management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a wear leveling management component (e.g., the wear leveling management component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
copying data, from a second group of data blocks in a second plurality of groups of data blocks that are mapped, to a first group of data blocks in a first plurality of groups of data blocks that are not mapped, to include the first group of data blocks in the second plurality of groups of data blocks that are mapped;
resetting a first sub-total write counter associated with the first group of data blocks, wherein a value of the first sub-total write counter indicates a first number of write operations performed on the first group of data blocks since the first group of data blocks has been included in the second plurality of groups of data blocks;
determining that a value of a first total write counter associated with the first group of data blocks exceeds a value of a second total write counter associated with a second group of data blocks by a first threshold value, wherein the value of the first total write counter is a maximum value among values of a plurality of total write counters, wherein each of the plurality of total write counters is associated with a corresponding one of the groups of data blocks in the first and second pluralities of groups of data blocks, and the value of the second total write counter is a minimum value among the values of the plurality of total write counters;
determining whether the value of the first sub-total write counter exceeds a second threshold value; and
responsive to determining that the value of the first total write counter exceeds the value of the second total write counter of the second group of data blocks by the first threshold value and the value of the first sub-total write counter exceeds the second threshold value, performing, by a processing device, a wear leveling operation on the first group of data blocks.

2. The method of claim 1, further comprising:
performing one or more writes to write data to the first group of data blocks; and
incrementing the value of the first sub-total write counter one or more times based on the one or more writes; and
performing the wear leveling operation on the first group of data blocks responsive to the value of the first sub-total write counter exceeding a threshold value.

3. The method of claim 1, wherein the value of the first total write counter indicates a total number of write operations performed on the first group of data blocks, wherein the total number of write operations is based on a first number of write operations performed on the first group of data blocks before the first group of data blocks is included in the second plurality of groups of data blocks and a second number of write operations performed on the first group of data blocks since the first group of data blocks has been included in the second plurality of groups of data blocks.

4. The method of claim 1, wherein performing the wear leveling operation on the first group of data blocks further comprises:
copying data of the first group of data blocks to a third group of data blocks in the first plurality of groups of data blocks to include the third group of data blocks in the second plurality of groups of data blocks; and
resetting a second sub-total write counter associated with the third group of data blocks, wherein a value of the second write counter indicates a number of write operations performed on the third group of data blocks since the third group of data blocks has been included in the second plurality of groups of data blocks.

5. The method of claim 1, wherein performing the wear leveling operation on the first group of data blocks further comprises determining a new address of a base pointer within the first group of data blocks, wherein the base pointer represents a first index of a plurality of indices associated with the first group of data blocks.

6. The method of claim 5, further comprising storing data at the first group of data blocks based on the new address of the base pointer within the first group of data blocks.

7. A system comprising:
a memory component; and
a processing device, operatively coupled with the memory component, to:
copy data, from a second group of data blocks in a second plurality of groups of data blocks that are mapped, to a first group of data blocks in a first plurality of groups of data blocks that are not mapped to include the first group of data blocks in the second plurality of groups of data blocks that are mapped;
reset a first sub-total write counter associated with the first group of data blocks, wherein a value of the first sub-total write counter indicates a first number of write operations performed on the first group of data blocks since the first group of data blocks has been included in the second plurality of groups of data blocks;

determine that a value of a first total write counter associated with the first group of data blocks exceeds a value of a second total write counter of a second group of data blocks by a first threshold value, wherein the value of the first total write counter is a maximum value among values of total write counters associated with the groups of data blocks in the first and second pluralities of groups of data blocks, and the value of the second total write counter is a minimum value among the values of the total write counters associated with the groups of data blocks in the first and second pluralities of groups of data blocks;

determine whether the value of the sub-total write counter exceeds a second threshold value; and responsive to determining that the value of the first total write counter exceeds the value of the second total write counter of the second group of data blocks by the first threshold value and the value of the first sub-total write counter exceeds the second threshold value, perform a wear leveling operation on the first group of data blocks.

8. The system of claim 7, wherein the processing device is further to:

perform one or more writes to write data to the first group of data blocks;

increment the value of the first sub-total write counter one or more times based on the one or more writes; and perform the wear leveling operation on the first group of data blocks responsive to the value of the first sub-total write counter exceeding a threshold value.

9. The system of claim 7, wherein the value of the first total write counter indicates a total number of write operations performed on the first group of data blocks, wherein the total number of write operations is based on a first number of write operations performed on the first group of data blocks before the first group of data blocks was included in the second plurality of groups of data blocks and a second number of write operations performed on the first group of data blocks since the first group of data blocks has been included in the second plurality of groups of data blocks.

10. The system of claim 7, wherein, to perform the wear leveling operation on the first group of data blocks, the processing device is further to:

copy data of the first group of data blocks to a third group of data blocks in the first plurality of groups data blocks to include the third group of data blocks in the second plurality of groups of data blocks; and reset a second write counter associated with the third group of data blocks, wherein a value of the second write counter indicates a number of write operations performed on the third group of data blocks since the third group of data blocks has been included in the second plurality of groups of data blocks.

11. The system of claim 7, wherein, to perform the wear leveling operation on the first group of data blocks, the processing device is further to determine a new address of a base pointer within the first group of data blocks, wherein the base pointer represents a first index of a plurality of indices associated with the first group of data blocks.

12. The system of claim 11, wherein the processing device is further to store data at the first group of data blocks based on the address of the base pointer within the first group of data blocks.

13. A non-transitory computer-readable storage medium comprising instructions that, when executed by a processing device, cause the processing device to:

copy data, from a second group of data blocks in a second plurality of groups of data blocks that are mapped, to a first group of data blocks in a first plurality of groups of data blocks that are not mapped to include the first group of data blocks in the second plurality of groups of data blocks that are mapped;

reset a first sub-total write counter associated with the first group of data blocks, wherein a value of the first sub-total write counter indicates a first number of write operations performed on the first group of data blocks since the first group of data blocks has been included in the second plurality of groups of data blocks;

determine that a value of a first total write counter associated with the first group of data blocks exceeds a value of a second total write counter of a second group of data blocks by a first threshold value, wherein the value of the first total write counter is a maximum value among values of total write counters associated with the groups of data blocks in the first and second pluralities of groups of data blocks, and the value of the second total write counter is a minimum value among the values of the total write counters associated with the groups of data blocks in the first and second pluralities of groups of data blocks;

determine whether the value of the sub-total write counter exceeds a second threshold value; and responsive to determining that the value of the first total write counter exceeds the value of the second total write counter of the second group of data blocks by the first threshold value and the value of the first sub-total write counter exceeds the second threshold value, perform a wear leveling operation on the first group of data blocks.

14. The non-transitory computer-readable storage medium of claim 13, wherein the processing device is further to:

perform one or more writes to write data to the first group of data blocks;

increment the value of the first sub-total write counter one or more times based on the one or more writes; and perform the wear leveling operation on the first group of data blocks responsive to the value of the first sub-total write counter exceeding a threshold value.

15. The non-transitory computer-readable storage medium of claim 13, wherein the value of the first total write counter indicates a total number of write operations performed on the first group of data blocks, wherein the total number of write operations is based on a first number of write operations performed on the first group of data blocks before the first group of data blocks was included in the second plurality of groups of data blocks and a second number of write operations performed on the first group of data blocks since the first group of data blocks has been included in the second plurality of groups of data blocks.

16. The non-transitory computer-readable storage medium of claim 13, wherein, to perform the wear leveling operation on the first group of data blocks based on the sub-total write counter, the processing device is further to:

copy data of the first group of data blocks to a third group of data blocks in the first plurality of groups data blocks to include the third group of data blocks in the second plurality of groups of data blocks; and reset a second write counter associated with the third group of data blocks, wherein a value of the second write counter indicates a number of write operations performed on the third group of data blocks since the third group of data blocks has been included in the second plurality of groups of data blocks.

\* \* \* \* \*